United States Patent [19]

Thompson

[11] Patent Number: 4,791,271
[45] Date of Patent: Dec. 13, 1988

[54] CAPSTAN DRIVE ASSEMBLY FOR FILLER WIRE IN ELECTRIC ARC WELDING

[75] Inventor: Floyd M. Thompson, Spring, Tex.

[73] Assignee: CRC-Evans Pipeline International, Inc., Houston, Tex.

[21] Appl. No.: 34,652

[22] Filed: Apr. 6, 1987

[51] Int. Cl.⁴ .............................. B23K 9/12; B21F 1/02
[52] U.S. Cl. .................................. 219/136; 219/137.2; 219/137.8; 140/147
[58] Field of Search .................. 219/136, 137.2, 137.8; 140/147; 72/160–162

[56] References Cited

U.S. PATENT DOCUMENTS

| | | | |
|---|---|---|---|
| 3,196,656 | 7/1965 | Johnston | 72/162 |
| 3,543,810 | 12/1970 | Scheller | 140/147 |
| 3,799,215 | 3/1974 | Willems | 219/137.8 X |
| 3,834,204 | 9/1974 | Ihle | 72/181 X |
| 4,464,919 | 8/1984 | Labbe | 72/162 |

FOREIGN PATENT DOCUMENTS

| | | | |
|---|---|---|---|
| 50-08704 | 4/1975 | Japan | 219/137.2 |
| 226060 | 1/1969 | U.S.S.R. | 219/137.2 |
| 1569358 | 6/1980 | United Kingdom | 219/137.8 |

Primary Examiner—E. A. Goldberg
Assistant Examiner—C. M. Sigda
Attorney, Agent, or Firm—Richards, Harris, Medlock & Andrews

[57] ABSTRACT

A capstan drive assembly for electric arc welding receives filler wire which can have an undetermined cast to the wire. The assembly provides for self feeding of the wire from the inlet completely through to a welding torch. No portion of the assembly must be opened or disassembled to feed the filler wire. The wire is captured in a groove on the periphery of a capstan and held in place by spaced apart pressure rollers which serve to impart a predetermined cast to the filler wire. The predetermined cast overcomes any previous cast which was present in the wire. After the wire has received this cast, it is directed between opposite sides of wire straightening rollers which serve to bend the wire in the opposite direction of the predetermined cast and apply sufficient force to counteract the set cast. This apparatus and procedure results in producing a filler wire which is substantially straight.

14 Claims, 2 Drawing Sheets

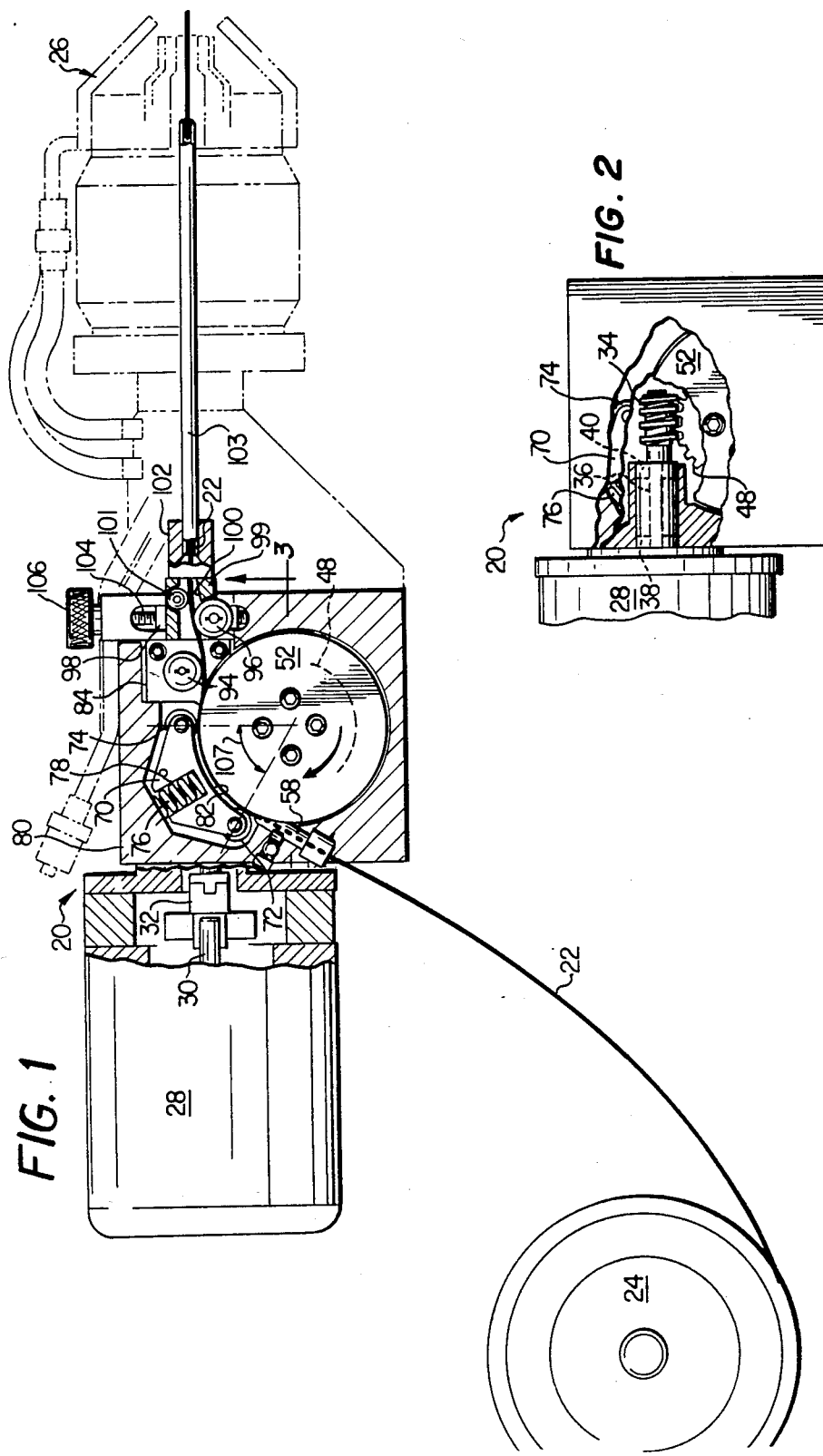

CAPSTAN DRIVE ASSEMBLY FOR FILLER WIRE IN ELECTRIC ARC WELDING

TECHNICAL FIELD

The present invention pertains in general to welding equipment and more specifically to such equipment for advancing a filler wire which is consumed in electric arc welding.

BACKGROUND OF THE INVENTION

The use of filler wire has come into wide acceptance in the field of electric arc welding. The wire serves as a consumable electrode which is continuously provided to an electric arc that melts the wire and deposits it at a welding bead. The use of filler wire has contributed to the development of automated welding equipment, particularly in the field of pipeline welding.

Existing automated welding systems have been successful in heavy welding applications, such as the welding of relatively large diameter pipelines. However, in lightweight applications, such as robotic welding, conventional wire feed systems have been less successful. A particular problem in lightweight, wire-feed welding systems is the difficulty in accurately positioning the wire at the welding bead. The filler wire is wrapped around a spool which applies a cast to the wire and the cast varies according to the diameter of the wire around the spool. In a conventional wire feed system the wire is directed through a bouden tube which feeds the wire to the arc. The size of the bouden tube must be made as small as possible to try to accurately position the wire. However, as the tube is made closer to the diameter of the wire, the friction of the tube increases thus making it more difficult to drive the wire through the tube to the welding arc. In keeping the friction to a low enough level, there must necessarily be space for movement of the wire. The wire is then free to twist about within the tube and this permits the wire to move erratically as it is applied to the arc. Such movement of the filler wire at the arc can offset the welding bead sufficiently far to cause a defective weld, which can result in rejection of the product.

A further difficulty with conventional wire feed systems is the excessive time and complexity involved in feeding the wire into the drive system. In conventional systems, various portions of the wire feed assembly must be opened or disassembled to allow the wire to be inserted and clamped to the drive mechanism. Since this must be done each time a spool of wire is replaced for the welder, a substantial amount of time can be wasted, especially in high production situations.

In view of the above problems with wire feed systems, there exists a need for a new wire feed mechanism which can drive the wire and position it with a high degree of accuracy and can load the wire rapidly without the need for opening the apparatus or removing components.

SUMMARY OF THE INVENTION

The present invention is directed to a method and apparatus for feeding and straightening filler wire which is used in electric arc welding. The first embodiment of the present invention is an apparatus which provides for feeding and straightening of such wire. The apparatus includes a motor-driven capstan which has a peripheral groove that receives the filler wire. Means are provided for pressing the filler wire against the capstan over a fixed distance of the capstan periphery. The pressure against the filler wire on the capstan impresses a predetermined cast into the filler wire which substantially eliminates any previous cast which was present in the filler wire. The filler wire is captured in the groove of the capstan, which is rotated to advance the filler wire and feed it to the electric arc. Additional means are provided which are offset from the capstan and serve to bend the filler wire, after it has separated from the capstan, to substantially counteract the predetermined cast and produce a resulting filler wire which has a substantially straight configuration.

BRIEF DESCRIPTION OF THE DRAWINGS

For a more complete understanding of the present invention and the advantages thereof, reference is now made to the following description taken in conjunction with the accompanying drawings in which:

FIG. 1 is an elevation and partially sectioned view of the wire drive assembly of the present invention, FIG. 2 is a sectioned and cut-away view of a part of the wire drive assembly shown in FIG. 1.

DETAILED DESCRIPTION OF THE INVENTION

Figure 3:
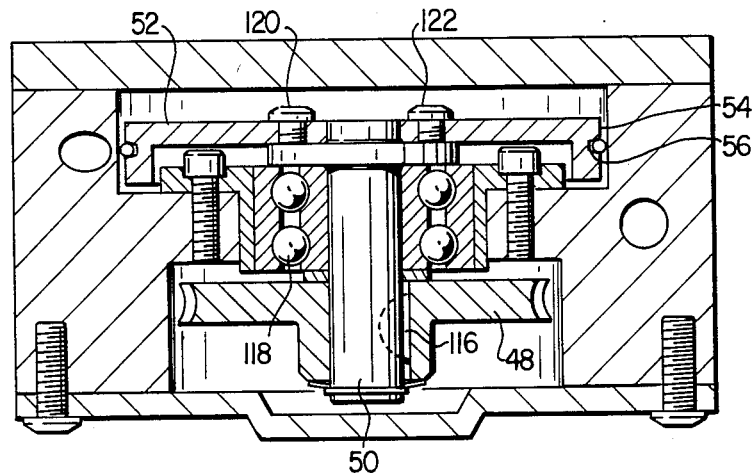
FIG. 3 is a section view of the wire drive assembly shown in FIG. 1 taken along the lines 3—3.

The present invention is directed to a lightweight, portable apparatus for supplying filler wire in electric arc welding, such as robotic welding. Welding of this type requires that the filler wire be very accurately positioned at the weld bead. An electric arc is drawn between the free end of the filler wire and the workpieces being welded. The filler wire is consumed as the weld progresses. The quality of the weld is highly dependent upon an accurate rate of delivery and an accurate lateral positioning of the filler wire. A drive mechanism for accurately driving the filler wire is described in U.S. Pat. No. 4,658,112 (Ser. No. 821,158 filed Jan. 21, 1986) to Thompson. The motors, electronics and drive configuration described in this prior patent can be used in conjunction with the operation of the present invention. As such, U.S. Pat. No. 4,658,112 (Ser. No. 821,158 filed Jan. 21, 1986), is incorporated herein by reference.

In precision welding applications, the filler wire must be positioned within a few thousandths of an inch of its required position. Should the filler wire deviate laterally from such position, the resulting welded article may prove to be defective. Mechanisms have been provided for accurately driving the filler wire, but problems are now being experienced in the lateral positioning of the wire. This is particularly true in robotic welding applications where the weld head is relatively lightweight and must be moved to many different positions. Typically, such filler wires have been forced through a bouden tube which extends to the weld site. When such tubes are made small in an attempt to accurately position the filler wire, they create so much friction within the tube that it becomes very difficult to drive the filler wire. If the tube is made larger to reduce friction, the filler wire has a tendency to twist back and forth like a spring when the bend, or cast, of the filler wire changes. Filler wire is typically supplied to a welder on spools, which must be replaced as the wire is consumed. Often, the filler wire is not uniformly wound on the spool and in all cases the diameter of the filler wire, and its resulting cast, changes as the wire is used.

The present invention provides the functions of driving the filler wire and also straightening the wire such that the wire at the torch will maintain an accurate position. The configuration of the present invention is also uniquely adapted to fabrication of a wire feeder in a very compact size which is suitable for mounting on a movable arm for robotic welding applications. Referring now to FIGS. 1 and 2, there is shown a partially cross sectioned view of a selected embodiment of the present invention, a wire drive assembly 20. The assembly 20 draws a filler wire 22 from a spool 24. The filler wire 22 is drawn through the assembly 20 and provided to a torch 26 shown in phantom lines. The assembly 20 provides a highly accurate drive rate for the filler wire 22 as is described in the above referenced U.S. patent to Thompson. A drive motor 28 is controlled by a phase locked loop and serves to drive a shaft 30. A coupler 32 joins the shaft 30 to a shaft 36. The shaft 36 is supported by bearings 38 and 40 and is further connected to a worm gear 34.

The worm gear 34 engages a capstan gear 48, which is further illustrated in FIG. 3. The capstan gear 48 is mounted on a shaft 50 which has a capstan 52 mounted thereto. As the worm gear 34 is driven by the motor 28, the capstan 52 is caused to rotate. The capstan 52 has an external peripheral surface 54 which is provided with an annular groove 56. The capstan 52 and groove 56 are shown in further detail in FIG. 5.

Further referring to FIG. 1, the filler wire 22 is received at an inlet wire guide 58. This wire guide is further shown in FIG. 4. When the filler wire 22 exits the inlet wire guide 58, it is directed into the groove 56 of the capstan 52.

A pressure roller shoe 70 is provided with respective leading and trailing rollers 72 and 74. Each of these rollers is mounted on a respective axle which is supported by the shoe 70. A spring 76 is positioned in an opening 78 within the shoe 70. The spring 76 is biased against a frame 80 such that the rollers 72 and 74 are driven downward against the capstan 52. The rollers 72 and 74 are mounted a fixed distance apart.

The shoe 70 further includes a scraper plate 82 which is contoured to match the surface configuration of the capstan 52. The plate 82 is positioned between the rollers 72 and 74. The rollers 72 and 74 serve to force the filler wire 22 into the groove 56 which causes the wire 22 to be captured by the capstan 52 such that rotation of the capstan 52 draws the filler wire 22 through the wire drive assembly 20.

After the wire 22 passes beneath the roller 74, it is captured by a stripper plate 84. This plate is shown in more detail in FIGS. 6 and 7. The plate 84 has a blade edge 86 which serves to lift the leading tip of the wire 22 out of the groove 56 and away from the capstan 52. The leading tip of the wire 22 is then directed below a wire straightening cam roller 94 which is mounted on the plate 82. The cam roller 94 is not powered and is free to rotate on its axis.

When the wire 22 passes beyond the roller 94 it is bent over a second wire straightening cam roller 96. The roller 96 is mounted on a movable assembly 98. From roller 94, the leading tip of the wire is passed through a plate 99 which has a tapered interior channel 100 and a cam roller 101 which extends into the channel 100. After the wire 22 passes over the roller 101 it is passed through a wire guide 102 where it is provided to the torch 26 through a bouden tube 103. Cam roller 101 is mounted on the movable assembly 98. The channel 100 also moves along with the assembly 98.

The assembly 98 is threadably secured to a screw thread shaft 104 which is mounted to the frame 80. A knob 106 is connected to the upper end of shaft 104. As the knob 106 is rotated, the assembly 98 is raised or lowered to vary the amount of bending force that is applied to the wire 22 between the wire straightening rollers 94, 96 and 101.

The rollers 72 and 74 are fixed in position relative to each other and are spaced apart at an angular distance indicated by the arrow 107. This angular distance is preferably in the range of 29° to 31°.

In a selected embodiment of the present invention, the capstan 52 has a diameter of 2.556 inches and the filler wire 22 is a stainless steel wire having a diameter of 0.035 inches.

Referring now to FIG. 3 there is illustrated a section view of the wire drive assembly 20 taken along the lines 3—3. The capstan gear 48 is secured to the shaft 50 by a key 116. The shaft 50 is supported by bearings 118. The capstan 52 is secured to the shaft 50 by means of bolts 120 and 122.

Figure 4:
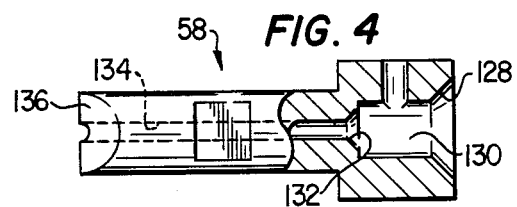
FIG. 4 is a detailed, partially cut-away, illustration of an inlet wire guide as shown in FIG. 1.

The inlet wire guide 58 is further described in reference to FIG. 4. The guide 58 includes a tapered opening 128 for receiving the leading tip of the filler wire 22. From the opening 128 the wire is directed into a chamber 130 where the wire is received by a further tapered opening 132 that directs the wire to a channel 134. The guide 58 has a radius end 136 which is shaped to correspond to the peripheral surface of the capstan 52. Wire directed into the opening 128 of the guide 58 is directed through the channel 134 and outward at the end 136 where it is delivered tangentially into the groove 56 of the capstan 52.

Figure 5:
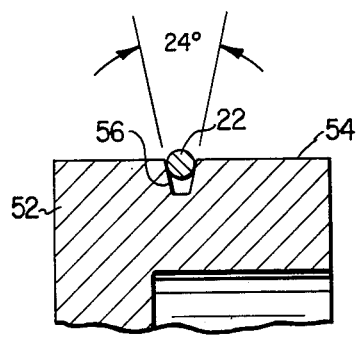
FIG. 5 is a detailed section view of the periphery of a capstan shown in FIG. 1.

A detailed view of the capstan 52 is shown in FIG. 5. The wire 22 is captured in the groove 56 which is on the periphery of the capstan 52. In a specific embodiment, the groove 56 has tapered walls which are at an angle of 24°. The filler wire 22 has a size that is particularly suited for engaging the groove 56 in capstan 52. The bottom of the groove 56 is flat to receive a softer filler wire 22, such as aluminum, which can be totally deformed by pressure that forces the wire into the groove 56.

Figure 6:
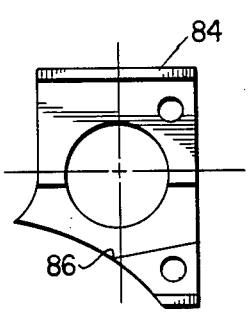
FIG. 6 is an elevation view of a stripper assembly shown in FIG. 1.
Figure 7:
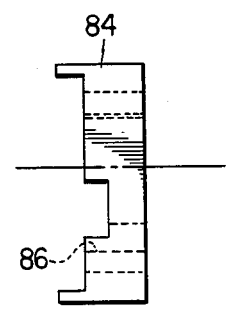
FIG. 7 is an end, elevation view of the stripper assembly shown in FIG. 6.

Referring now to FIG. 6 there is illustrated the stripper plate 84. A further elevation view of the plate 84 is shown in FIG. 7. Plate 84 includes the blade edge 86 which lifts the leading tip of wire 22 from capstan 52 and directs it below roller 94.

Operation of the wire drive assembly 20 is now described in reference to FIGS. 1-7. A principle advantage of the present invention is the self-feeding capability of the wire drive assembly 20. Previous wire feed machines have required that various portions of the machine be opened or removed in order to insert the filler wire through the machine. But, with the present invention, the filler wire is inserted into the inlet wire guide 58 where it is captured and drawn completely through the assembly 20 and fed to the torch 26. This is accomplished without the requirement to remove or disassemble any part of the apparatus 20.

When the filler wire 22 is inserted into the inlet wire guide 58, the guide directs the leading tip of the filler wire 22 into the groove 56 of the capstan 52. The wire is pushed by an operator until it is captured between the leading roller 72 and the capstan 52. At the time that the filler wire is supplied to the assembly 20, the motor 28 is activated to drive the capstan 52 in a clockwise direction (FIG. 1). The wire 22 is pinched between the roller 72 and the capstan 52. As soon as the wire 22 is captured, the operator no longer need apply any force to insert the wire into the inlet wire guide 58.

After the wire is captured between the roller 72 and the capstan 52, the leading tip of the wire passes the roller 72 where it strikes the scraper plate 82. This plate carries the tip of the wire 22 forward, holding it close to the surface of the capstan 52. When the leading tip of the wire 22 reaches the roller 74 it is forced into the groove 56 between the roller 74 and the capstan 52. At this point the wire 22 is held firmly in place in the groove 56 between the rollers 72 and 74.

When the leading tip of the wire 22 passes the trailing roller 74, it is captured by the blade edge 86 of plate 84 which extracts the leading tip of the wire 22 from the groove 56. The plate 84 then directs the wire 22 to the outer surface of the roller 94 nearest capstan 52. As the leading tip of the wire 22 progresses further, it strikes the outer surface of the roller 96 which deflects the wire 22 into the channel 100 which in turn guides the wire over the roller 101 to the wire guide 102. After the wire 22 has reached the guide 102, it is tensioned between the rollers 94, 96 and 101 such that it is not contacting the blade edge 86 or any portion of the plate 82 or plate 84. Further, once the wire has been completely fed through the assembly 20, it rides entirely on moving surfaces and does not touch the scraper plate or any other plates. This eliminates friction that might be caused by continuously riding the wire 22 on a scraper plate for delivering it to a roller. Thus, once the wire 22 is fed through the inlet wire guide 58, it is self-threaded through the assembly 20 and driven through the wire guide 102 and tube 103 where it is provided to the torch 26.

When the wire 22 is carried over the capstan 52 between the rollers 72 and 74, it is impressed with a cast that is determined by the angular travel of the wire and the radius of the capstan 52. The pressure roller shoe 70 is driven downward with sufficient force by the spring 76 such that the rollers 72 and 74 drive the wire 22 into the groove 56. The wire 22 is thus given a fixed cast which is independent of any previous cast that may have been impressed upon the wire 22. Such previous casts are most often caused by the winding of the wire 22 around the spool 24. The cast of the wire 22 as it leaves the spool 24 changes due to the varying diameter of the wire 22 about the spool 24. However, once the wire 22 passes the trailing roller 74, it is impressed with a new, uniform, predetermined cast.

The wire straightening rollers 94, 96 and 101 serve the function of counteracting the cast which was applied immediately preceding contact with the roller 94. The roller 96 can be adjusted vertically by operation of the knob 106 to apply a varying bending force to the wire 22 between the rollers 94 and 101. The knob 106 is adjusted such that the wire 22 exits from the outlet wire guide 102 having a substantially straight configuration. The adjustment knob 106 makes it possible to use different types of wire, such as stainless steel, steel, aluminum and so forth as well as different diameters of wire. Thus, the assembly 20 is sufficiently flexible to handle almost any required type of welding filler wire.

In summary, the present invention provides an apparatus for feeding and straightening a filler wire which is drawn from a spool and supplied to an arc in electric arc welding. As the wire is received from the spool it can have a wide range of casts which could cause distortion in the welding operation by laterally moving the filler wire as it is delivered to the arc. The wire is self fed through the drive assembly without the requirement to open or disassemble any portion of the assembly. In traveling through the drive assembly, the wire is first impressed with a predetermined cast which overcomes any previous cast that was present in the wire. Next, the wire is bent between wire straightening rollers to counteract the predetermined cast and thereby produce a filler wire which is substantially straight.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

I claim:

1. Apparatus for feeding and straightening a filler wire which is drawn from a spool and supplied to arc in electric arc welding, comprising:
   a motor-driven capstan having a peripheral groove for receiving said filler wire,
   means for pressing said filler wire against said capstan over a predetermined distance of the periphery of said capstan for impressing a predetermined cast into said filler wire to substantially eliminate any previous cast in said filler wire, said pressing means including a leading roller for pressing said filler wire into the groove at a first position on the periphery of said capstan and a trailing roller for pressing said filler wire into the groove at a second position on the periphery of said capstan, said first and second positions being separated by the predetermined distance, said capstan for advancing said filler wire, and
   means offset from said capstan for bending said filler wire, after separation of said filler wire from said capstan, to substantially counteract said predetermined cast and produce said filler wire in a substantially straight configuration for delivery to said arc.

2. Apparatus as recited in claim 1 wherein said means for bending includes means for adjusting the degrees of bending applied to said filler wire.

3. Apparatus as recited in claim 1 wherein said means for bending comprises a first fixed roller and a second variable positionable roller wherein said filler wire rides on said first and second rollers.

4. Apparatus as recited in claim 1 including an inlet wire guide for feeding said filler wire to between said capstan and said means for pressing.

5. Apparatus as recited in claim 1 wherein said means for pressing is a floating pressure shoe mounting the leading rollers and the trailing roller for pressing said filler wire into said groove.

6. Apparatus as recited in claim 5 including a scraper plate between said leading roller and said trailing roller, said scraper plate for guiding the leading tip of said filler wire to said trailing roller.

7. Apparatus as recited in claim 1 including a blade near said capstan and said means for pressing for extracting said filler wire from said groove.

8. A wire feeder for providing filler wire in electric arc welding, comprising:
   a capstan having an annular groove in the periphery thereof for receiving said filler wire,
   a motor for driving said capstan,
   an inlet wire guide for receiving said filler wire and supplying said filler wire tangentially to said capstan at said groove,
   a floating pressure shoe having a leading roller and a trailing roller, said leading and trailing rollers driven by said shoe against the periphery of said capstan for holding said filler wire in said groove, said pressure shoe having a contoured first scraper plate between said leading and trailing rollers for driving a leading tip of said filler wire between said trailing roller and said capstan,
   a first wire straightening roller offset from the periphery of said capstan,
   a stripper plate having a leading edge positioned at the periphery of said capstan, said stripper plate for lifting the leading tip of said filler wire to the surface of said first wire straightening roller,
   a second wire straightening roller offset from the periphery of said capstan, and positioned parallel to said first wire straightening roller,
   the first wire straightening roller directs the leading tip of said filler wire from the surface of said first wire straightening roller to the surface of said second wire straightening roller, and
   said first and second wire straightening rollers positioned for passing said filler wire on opposite sides thereof, wherein said filler wire receives a first cast as it passes between the leading and trailing rollers of said pressure shoe and said capstan, and recesses a second cast when said filler wire passes over said first and second wire straightening rollers.

9. A wire feeder as recited in claim 8 including means to position one of said wire straightening rollers laterally for adjusting the degree of bending applied to said filler wire.

10. A method for straightening filler wire which is drawn from a spool which supplies wire to a an arc for electric arc welding, comprising the steps of:
   advancing said filler wire by rotating a capstan having said filler wire pressed against a predetermined arcuate length of the periphery of said capstan by first and second rollers spaced about the periphery of the capstan,
   deforming said filler wire to have a predetermined cast as said filler wire is drawn over a portion of the periphery of said capstan, wherein said predetermined cast substantially overcomes previous casts impressed to said filler wire,
   removing said filler wire from contact with said capstan after deforming said filler wire to have said predetermined cast, and
   after removal from said capstan, deforming said filler wire in an opposite direction to said predetermined cast with apporximately an equal magnitude to that of said predetermined cast for making said filler wire substantially straight.

11. The method recited in claim 10 wherein said step of deforming said filler wire comprises forcing said filler wire into a groove in the surface of said capstan by the first and second rollers.

12. The method recited in claim 10 wherein said filler wire rides only on moving surfaces thereby not sliding while in contact with any surface.

13. A method for self-feeding filler wire through a wire feeder for supplying the filler wire to an arc for electric welding, comprising the steps of:
   directing a leading tip of said filler wire tangentially to a peripheral surface of a capstan, said surface having an annular groove for receiving said filler wire,
   capturing the leading tip of said filler wire in said groove between a first pressure roller and said capstan,
   rotating said capstan to advance said filler wire,
   deflecting the leading tip of said filler wire by a first scraper plate which directs the leading tip of said filler wire between a second pressure roller and said capstan, said filler wire being deformed to have a first cast as the filler wire passes between first said and second pressure rollers,
   deflecting the leading tip of said filler wire from out of said groove by a stripper plate toward the surface of a first wire straightening roller which is offset from the periphery of said capstan,
   directing said leading tip of said filler wire to the surface of a second wire straightening roller aftter the leading tip of said filler wire has passed said first wire straightening roller, and
   said filler wire passing on opposite sides of said wire straightening rollers to an outlet whereby said filler wire rides on said rollers and said capstan without contact to said scraper plate and stripper plate when said leading tip has passed to said outlet.

14. A method for feeding and straightening filler wire for electric arc welding wherein the filler wire has been stored on a spool and has been impressed with undesirable casts, comprising the steps of:
   directing said filler wire between a first pressure roller and the periphery of a capstan which has a groove in the periphery thereof for receiving said filler wire,
   rotating said capstan to advance said filler wire wherein said filler wire is captured in said groove, said filler wire being maintained in said groove by a scraper plate as said capstan is advanced,
   passing said filler wire in said groove between a second pressure roller and said capstan, said second pressure roller fixed in position relative to said first pressure roller, whereby said filler wire is defomred to have a predetermined cast during the travel of said filler wire between said first and second pressure rollers,
   removing said filler wire from said groove after said filler wire has passed said second pressure roller, and
   passing said filler wire on opposite sides of straightening rollers, after removal of said filler wire from said groove, for deforming said filler wire between said straightening rollers in a direction opposite to that of said predetermined cast with a magnitude substantially equal to said predetermined cast, whereby said filler wire is rendered to be substantially straight following passage between said straightening rollers.

* * * * *

UNITED STATES PATENT AND TRADEMARK OFFICE
CERTIFICATE OF CORRECTION

PATENT NO. : 4,791,271
DATED : Dec. 13, 1988
INVENTOR(S) : Thompson

It is certified that error appears in the above-identified patent and that said Letters Patent is hereby corrected as shown below:

Claim 8, line 24, following "wire" insert --from said groove of said capstan and directing said filler wire--.

Claim 8, line 37, delete "recesses" and substitute --receives--.

Signed and Sealed this

Second Day of May, 1989

Attest:

DONALD J. QUIGG

Attesting Officer

Commissioner of Patents and Trademarks